US009127495B2

(12) United States Patent
Romero et al.

(10) Patent No.: US 9,127,495 B2
(45) Date of Patent: Sep. 8, 2015

(54) SECURE ENCLOSURE

(71) Applicant: NCR CORPORATION, Duluth, GA (US)

(72) Inventors: Antonio Romero, Sao Paulo (BR); Leonardo Morgado, Manaus (BR); Joao Oliveira, Sao Paulo (BR)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/800,397

(22) Filed: Mar. 13, 2013

(65) Prior Publication Data

US 2014/0261110 A1 Sep. 18, 2014

(51) Int. Cl.
*G06F 19/00* (2011.01)
*G06Q 40/00* (2012.01)
*G07D 11/00* (2006.01)
*E05G 1/026* (2006.01)
*G07F 19/00* (2006.01)
*E05G 1/024* (2006.01)

(52) U.S. Cl.
CPC ................ *E05G 1/026* (2013.01); *G07F 19/20* (2013.01); *E05G 1/024* (2013.01)

(58) Field of Classification Search
USPC ............................... 235/379, 381; 705/39–45
See application file for complete search history.

(56) References Cited

U.S. PATENT DOCUMENTS

| | | | | |
|---|---|---|---|---|
| 4,293,776 | A * | 10/1981 | Sick et al. | 250/559.42 |
| 5,427,036 | A * | 6/1995 | Fee et al. | 109/46 |
| 5,996,888 | A * | 12/1999 | Gromatzky | 232/15 |
| 7,594,721 | B2 * | 9/2009 | Belbey et al. | 347/104 |
| 8,684,262 | B1 * | 4/2014 | Eastman et al. | 235/379 |
| 2003/0010673 | A1 * | 1/2003 | Duban-Hu et al. | 206/711 |
| 2004/0178564 | A1 * | 9/2004 | Graef et al. | 271/162 |
| 2007/0000993 | A1 * | 1/2007 | Graef et al. | 235/379 |
| 2007/0095227 | A1 * | 5/2007 | Belbey et al. | 101/232 |
| 2009/0188973 | A1 * | 7/2009 | Coventry et al. | 235/379 |
| 2014/0048594 | A1 * | 2/2014 | Kovacs | 235/379 |

FOREIGN PATENT DOCUMENTS

GB 2345181 A * 6/2000

* cited by examiner

*Primary Examiner* — Tuyen K Vo
(74) *Attorney, Agent, or Firm* — Joseph P. Mehrle

(57) ABSTRACT

A secure enclosure comprises: a body defining an access opening closed by a door, and a body media slot. A secure chamber is mounted outside the body and surrounds the body media slot, the secure chamber defining a chamber media slot. The secure enclosure may further comprise a media transport operable to convey media between the body media slot and the chamber media slot. The secure chamber body may also define a purge slot located on an underside of the chamber body so that media items that are not removed by a customer may be dropped through the purge slot.

13 Claims, 7 Drawing Sheets

SECURE ENCLOSURE

The present invention relates to improvements in or relating to a secure enclosure.

Secure enclosures, such as safes, strongrooms, and vaults, are typically used to store valuable items. One particular application of secure enclosures is to house valuable components of an automated teller machine (ATM), such as a cash dispenser, a cash acceptance module, and the like. The value of such components is principally derived from the large amounts of cash stored within them.

Secure enclosures provided in ATMs (hereinafter "ATM safes") differ from conventional safes in that ATM safes include apertures. These apertures may be in the form of slots through which media items (such as banknotes) enter and exit a cash dispenser in the ATM safe, and holes through which control cables pass from the cash dispenser to an ATM controller. The ATM safe has to be designed so that these apertures do not compromise the security of the ATM safe. This is typically achieved by strengthening areas around the apertures, for example, with additional areas of steel.

ATM safes are designed to resist attack from many different types of tools, such as sledgehammers, power drills, and thermal cutting tools. However, it is becoming more common for ATM safes to be subjected to attacks from explosives, such as plastic explosives, or explosive gas (for example, oxyacetylene or butane gas). In a typical attack, an ATM aperture is created or accessed, for example by drilling or cutting through a thin shutter covering an existing aperture, such as a cash dispense slot. The explosive substance (solid or gas) is inserted into the ATM through this aperture then detonated.

ATM safes can be designed to withstand explosive attacks by strengthening the ATM safe door and the internal corners of the ATM safe. However, explosion-resistant ATMs typically cost several times the price of a similar safe which does not resist an explosive attack. Even then, if more explosive is used then the safe will not withstand the attack.

It would be advantageous to be able to provide a low cost safe that is resistant to both conventional attacks (from power tools, sledgehammers, and the like) and attacks using explosives.

According to a first aspect of the present invention there is provided a secure enclosure comprising: a body defining (i) an access opening and (ii) a body media slot; and a secure chamber mounted outside the body and surrounding the media slot, the secure chamber defining a chamber media slot.

The body preferably includes a door hingeably coupled to sidewalls of the body for securely closing an access opening defined by the sidewalls of the body.

The body media slot may be defined by the door, or by one of the sidewalls of the body, such as the sidewall opposite the door.

By virtue of this aspect, any explosive introduced into the secure chamber will be largely contained within the secure chamber.

The secure enclosure may comprise a media transport operable to convey media between the body media slot and the chamber media slot.

The media transport may comprise a rotatable cylindrical transport. Alternatively, the media transport may comprise a linear transport.

The rotatable cylindrical transport may comprise secure drum defining a slot for receiving media items. The secure drum may comprise steel. By providing a secure drum defining a single slot, when that slot is not aligned with the chamber media slot, the secure drum blocks access to the secure chamber via the chamber media slot. This makes it more difficult for an attacker to insert explosives into the secure chamber.

Where the secure drum is rotated to a first position, a slot in the secure drum aligns with the body media slot to allow media to enter the secure drum. At the first position, the secure drum slot may align with the media slot. When rotated to a second position, the secure drum slot may align with the chamber media slot to allow media to be removed from the secure chamber by a customer. When rotated to a third position, the secure drum slot may align with a purge slot defined by a lower surface of the secure chamber, so that media items may exit the secure drum and pass through the purge slot into a purge compartment.

The secure drum may be rotatable about a shaft mounted via bearing mounts within the secure chamber. The bearing mounts may be bolted (or otherwise removably connected) to brackets. The brackets may be welded to inner surfaces of the secure chamber or to the body. The secure drum may be mounted such that force applied to the secure drum via the chamber media slot will break the bearing mount and/or the shaft, causing the secure drum to fall to the bottom of the secure chamber.

The secure chamber may be vertically dimensioned such that when the secure drum falls, the secure drum blocks the chamber media slot, thereby preventing unauthorized access via the chamber media slot.

The secure chamber may define upstanding purge media guides on an inner, lower surface thereof.

The upstanding purge media guides may be dimensioned and configured to support the secure drum if the bearing mount and/or the shaft break.

The secure chamber may be horizontally dimensioned such that the secure drum occupies most of the horizontal space (in a horizontal direction parallel to an axis of the secure drum and/or in a horizontal direction perpendicular to the axis of the secure drum) within the secure chamber, thereby preventing an attacker from pushing the secure drum away from the chamber media slot.

Where a rotatable cylindrical transport is used, the secure drum may comprise a motor-driven clamp that opens to receive media items and closes to clamp media items while the secure drum is rotating. Alternatively, a cam and cam follower arrangement may be provided so that rotation of the secure drum automatically opens and closes the clamp at the correct positions for receiving media items and for clamping media items during rotation, respectively.

This aspect of the invention has the advantage of restricting the ability of a criminal to introduce explosives into the secure chamber and to ensure that if any explosives are introduced into the secure chamber then the explosion is substantially confined to the secure chamber, so that the enclosure body is not destroyed.

The body may comprise support walls having a composite construction. Alternatively, the body may comprise a single material, such as steel.

The composite construction may comprise a central material sandwiched between two layers (an external layer on an outer surface of the central material and an internal layer on an inner surface of the central material). The central material may comprise steel, high density concrete, or the like. In one embodiment, the central material comprises high density concrete incorporating a first set of parallel, spaced, rods aligned in a first direction, and a second set of parallel, spaced, rods aligned transverse to the first direction. Other conventional components may be included to improve resistance of the body to attack, for example, fragments of metal may be incorporated into the central material. The external layer and the internal layer may be thin relative to the thickness of the central material.

According to a second aspect of the present invention there is provided a secure chamber for removably coupling to a secure enclosure, the secure chamber comprising: a body defining (i) an opening for surrounding a media slot in the secure enclosure, (ii) a chamber media slot through which media may be conveyed between the secure chamber and a customer, and (iii) a transport operable to transfer media between the media slot in the secure enclosure and the chamber media slot.

The secure chamber body may define a purge slot located on an underside of the body so that media items that are not removed by a customer may be dropped through the purge slot.

The purge slot may provide an exit for any explosive gas introduced into the secure chamber prior to detonation of the explosive gas in an attempt by a criminal to compromise the secure enclosure. Similarly, the purge slot may provide a preferential exit for an explosion within the secure chamber.

The secure chamber may further comprise a plurality of engagement anchors at a side of the secure chamber opposite the chamber media slot.

The engagement anchors may comprise lugs extending from a portion of the body defining the opening. Each lug may include an aperture. When the secure chamber is mounted onto the secure enclosure, the lugs may extend through engagement slots defined by the secure enclosure so that the apertures are located inside the secure chamber. Plates or rods can be driven through the apertures on the engagement lugs to fix the secure chamber to the secure enclosure. The secure chamber can be removed by first removing the plates or rods, then removing the secure chamber from engagement with the secure enclosure.

The transport may comprise a rotary transport or a linear transport.

The rotary transport may comprise a secure drum comprising a pair of opposed clamps supported in the cylindrical body and that move apart and close together as the secure drum is rotated. This enables the opposed clamps to receive media items therebetween when at a first rotary position (such as a position aligned with the media slot in the secure enclosure), and to present media items when at a second rotary position (such as a position aligned with the chamber media slot).

The opposed clamps may comprise a pair of clamp plates that are secured together at respective first ends thereof and open and close at respective further ends thereof automatically as the secure drum rotates. In other words, a cam arrangement may be provided to open and close the opposed clamps as the cylindrical body rotates.

The opposed clamps may discharge media items located therebetween when at a third rotary position (such as a position aligned with a purge bin located beneath the secure chamber).

These and other aspects of the present invention will be apparent from the following specific description, given by way of example, with reference to the accompanying drawings, in which.

Figure 10:
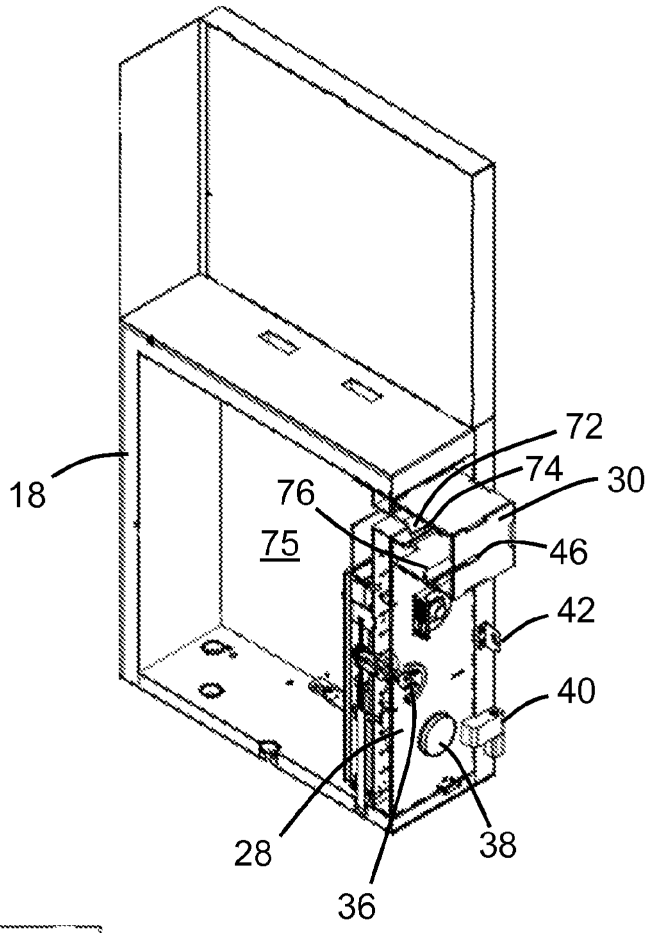
FIG. 10 is a sectional perspective view of the ATM as shown in FIG. 7 as cut through line 10-10 on FIG. 8.
Figure 11:
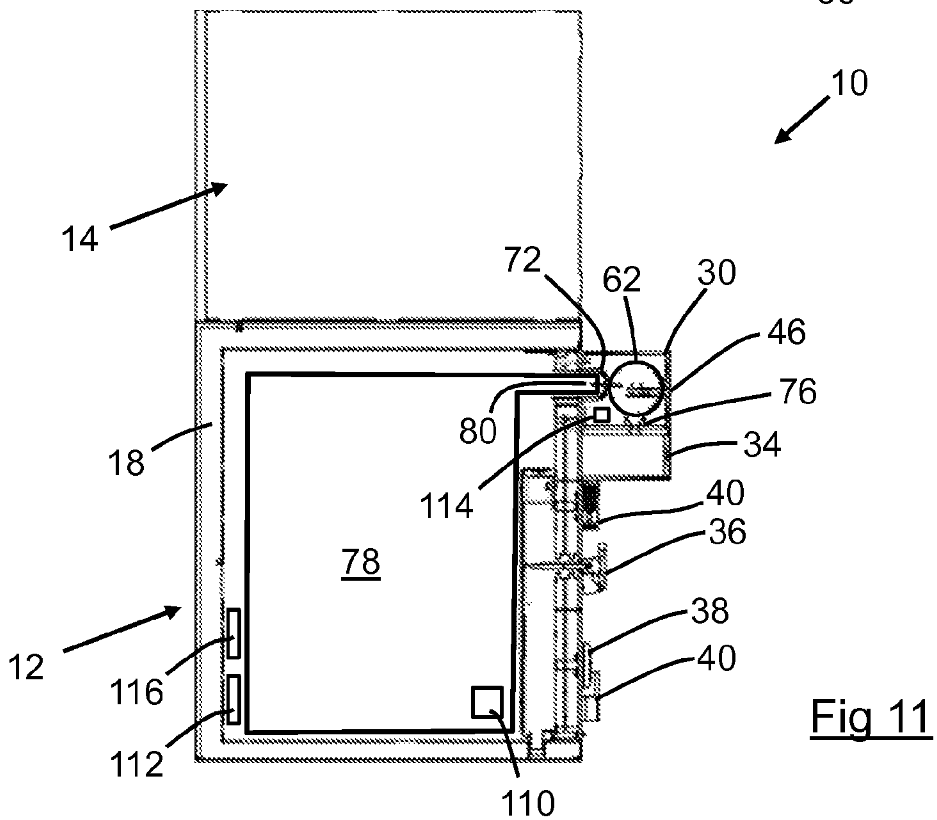

FIG. 11 is a side view of the sectioned ATM as shown in FIG. 10, but with a media dispenser located within the ATM, a media transport located within the secure chamber, and the purge compartment beneath the secure chamber; and FIGS. **12*a* to 12*f* illustrate the media transport of FIG. 11** in six different positions corresponding to various positions between receiving media items, dispensing media items, and purging media items.

It should be appreciated that the above drawings include versions of CAD renderings that have been simplified for clarity of presentation and ease of understanding. In addition, some features have been removed from some views to aid clarity.

Reference is first made to FIGS. 1 to 13, which show various views of a self-service terminal (SST) 10 in the form of an automated teller machine (ATM). The ATM 10 is shown without any decorative cladding.

The ATM 10 comprises a secure enclosure 12, a secure upper compartment 14 located above, and having sidewalls extending from, the secure enclosure) 2, and a fascia 16 closing the secure upper compartment 14.

The secure enclosure 12 comprises a main safe body 18 and a front cover 20 coupled to the main safe body 18 by a set of hinges 22. The front cover 20 defines a customer media slot 24 through which media items (such as banknotes) can be dispensed to a customer.

Figure 1:
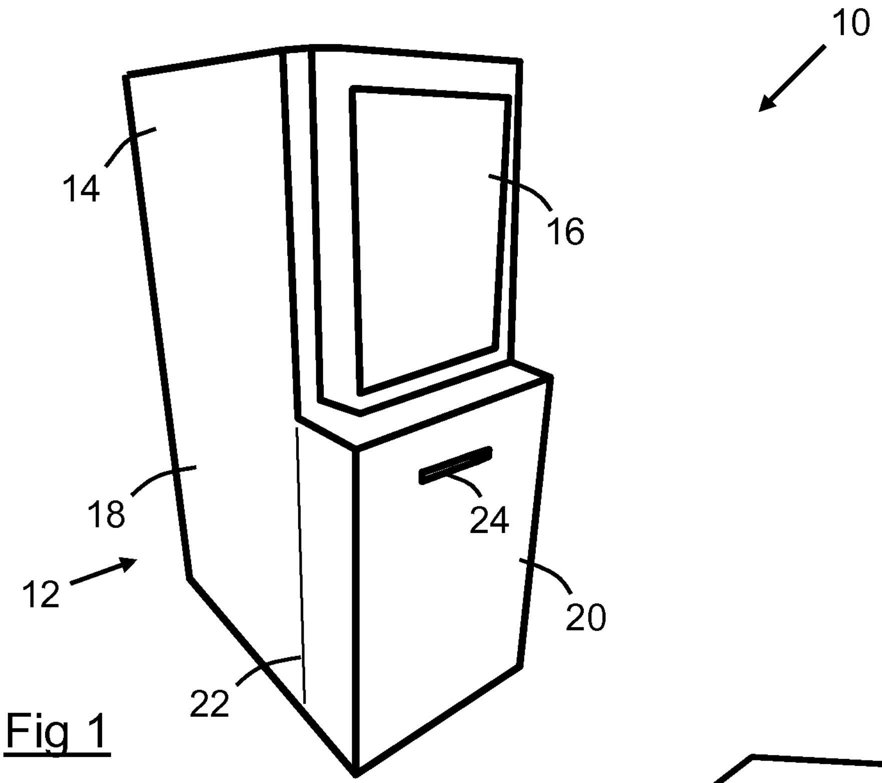
FIG. 1 is a front perspective view of a self-service terminal in the form of an automated teller machine (ATM) (with decorative cladding removed) comprising a secure enclosure according to one embodiment of the present invention.
Figure 2:
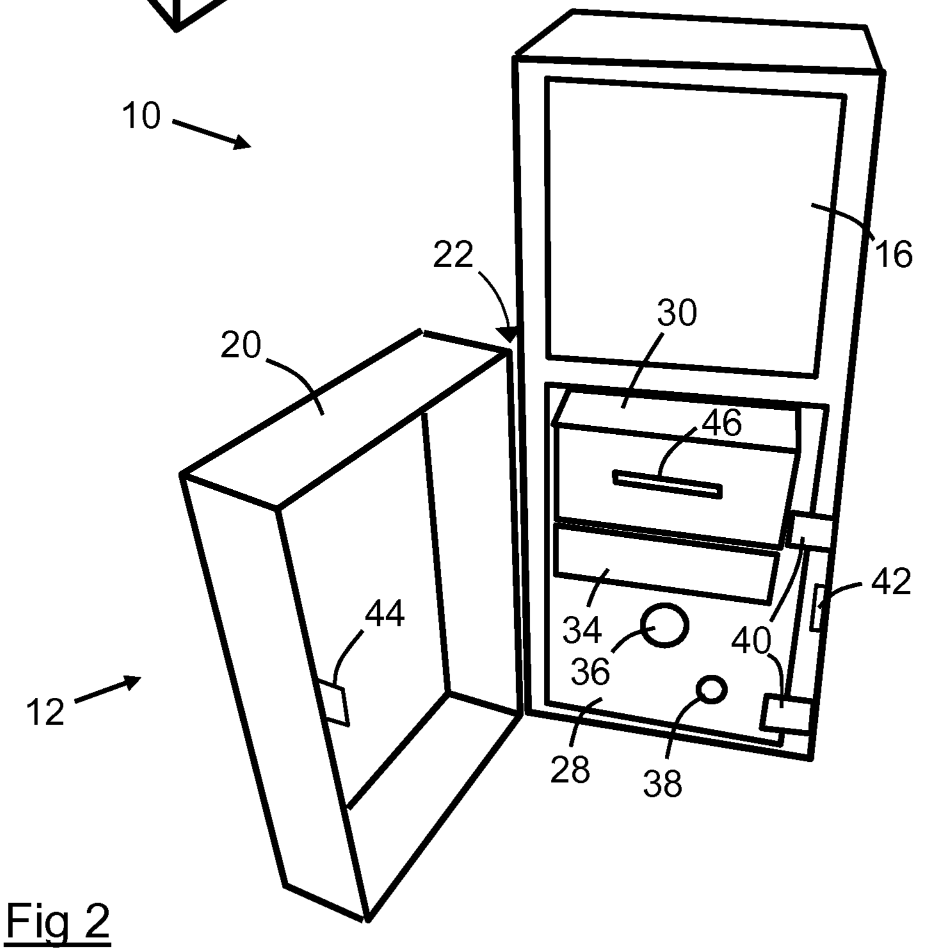
FIG. 2 is a front view of the ATM of FIG. 1 illustrating a portion (a front cover) of the secure enclosure in an open position revealing a safe door, a secure chamber, and a purge compartment.

The hinges 22 allow the front cover 20 to be opened (as shown in FIG. 2) revealing a safe door 28 (which is part of the main safe body 18), a secure chamber 30, a purge compartment 34, a safe door handle 36, a safe door lock 38, safe door hinges 40, and a front cover lug 42.

The front cover 20 includes a latch 44 that co-operates with the front cover lug 42 to retain the front cover 20 in a closed position.

The safe door handle 36, safe door lock 38, and safe door hinges 40 are conventional and will not be described in detail herein. The safe door 28 closes an access opening within the secure enclosure 12 (that is, the main opening used to access the contents of the main safe body 18).

The secure chamber 30 defines a chamber media slot 46 through which media items may pass between the customer and an inside of the main safe body 18.

Figure 3:
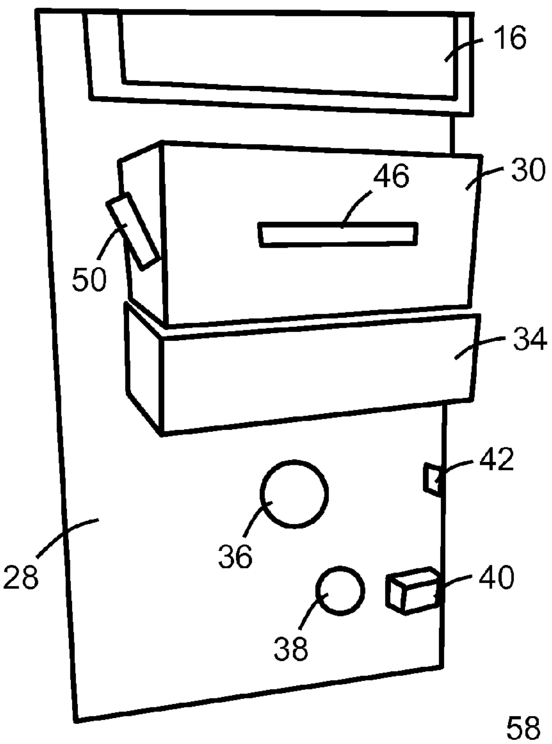
FIG. 3 is a front perspective view of the safe door, the secure chamber, and the purge compartment of FIG. 2.
Figure 4:
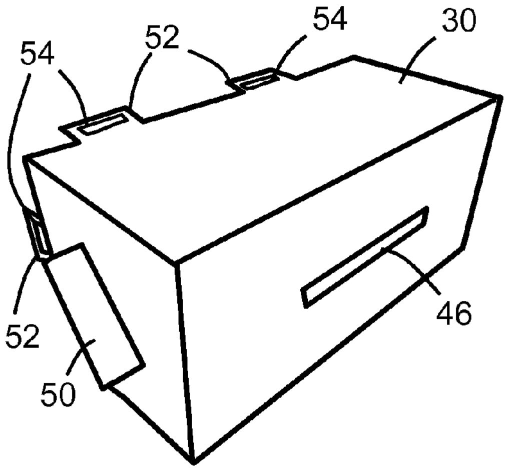
FIG. 4 is a front perspective view of the secure chamber of FIG. 3.

As shown more clearly in FIGS. 3 and 4, the secure chamber 30 also includes chamber handles 50 mounted on the sides of the secure chamber 30. These enable the secure chamber 30 to be lifted away from the main body safe 18 when the secure chamber 30 has been released (as will be described in more detail below).

As shown in FIG. 4, the secure chamber 30 includes mounting lugs 52 (only three of the six mounting lugs 52 are visible in FIG. 4). Each of these mounting lugs 52 defines an aperture 54. The secure chamber 30 is basically a miniature safe body, and comprises a strong box made from thick steel or a composite material (high density concrete reinforced with steel rods, transverse to each other, or metal fragments). This is to ensure that the secure chamber 30 can resist an explosive attack.

Figure 5:
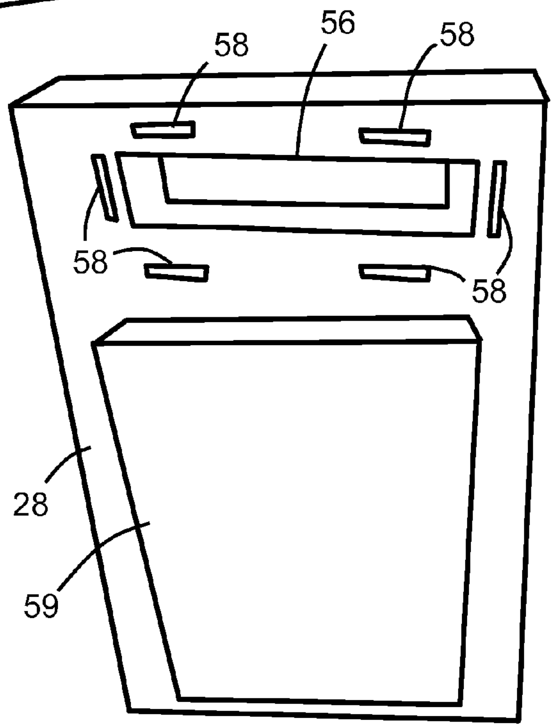
FIG. 5 is a perspective rear view of the safe door of FIG. 3.

As shown in FIG. 5 (which is a rear view of the safe door 28), the safe door 28 defines a body media slot 56 through which media items may pass from within the main safe body 18 to a customer (or in the opposite direction for a banknote deposit transaction). Surrounding the body media slot 56 are six chamber engagement slots 58 corresponding in size and location to the mounting lugs 52 on the secure chamber 30.

To attach the secure chamber 30 to the safe door 28, the mounted lugs 52 are inserted into the engagement slots 58, and fixings (not shown) in the form of wedges, pins, or plates are driven through the lug apertures 54 on the inner side of the safe door 28. This prevents the secure chamber 30 from being removed from the safe door 28. To remove the secure chamber 30, an authorized person must first open the safe door 28 then remove the fixings from the lug apertures 54. The secure chamber 30 can then be lifted free from the safe door 28 using the chamber handles 50.

The safe door 28 also includes a conventional door reinforcement 59, which provides further protection for any attack on the safe door 28, the safe handle 36, or the safe lock 38.

Figure 6:
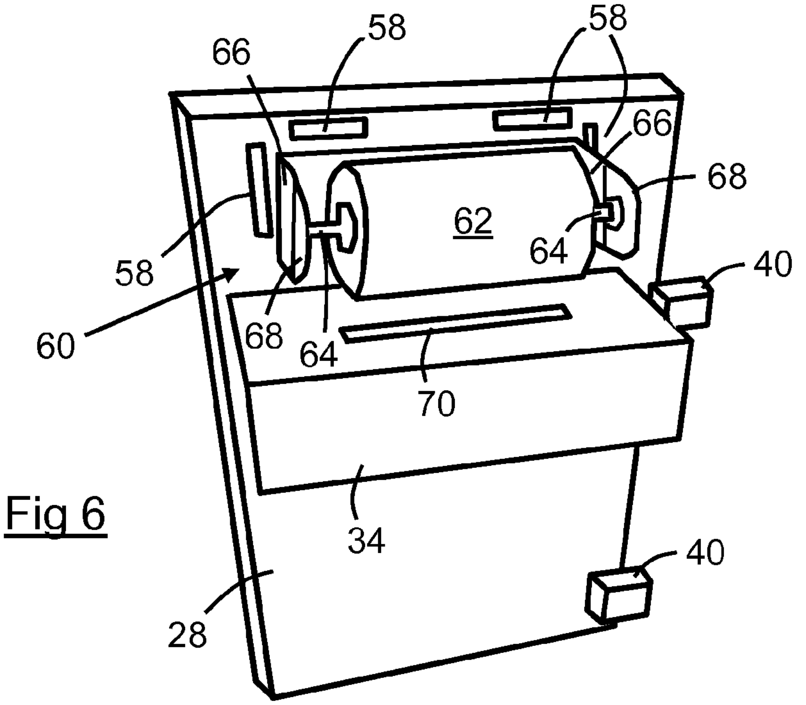
FIG. 6 is a front perspective view similar to that of FIG. 3 but with a portion (a secure cover) of the secure chamber removed.

When the secure chamber 30 is removed, as shown in FIG. 6, a media transport 60 is visible. In this embodiment, the media transport 60 comprises a rotatable cylinder (in the form of a secure drum) 62 mounted on a rotating shaft 64 to a pair of brackets 66 via bearing mounts 68. The pair of brackets 66 are welded to the safe door 28. The bearing mounts 68 are bolted, or otherwise removably fixed, to the brackets 66. This enables the secure drum 62 to be removed for servicing by unbolting the bearing mounts 68.

As illustrated in FIG. 6, the secure drum 62 is mounted above, and aligned with, a purge compartment slot 70 defined by the purge compartment 34. The primary purpose of the purge compartment 34 is to store media items (such as banknotes) that are presented to a customer but are not removed by that customer. However, in this embodiment, the purge compartment also serves as a secondary blast container in the event of an explosive attack on the ATM 10, as will be described in more detail below.

Figure 7:
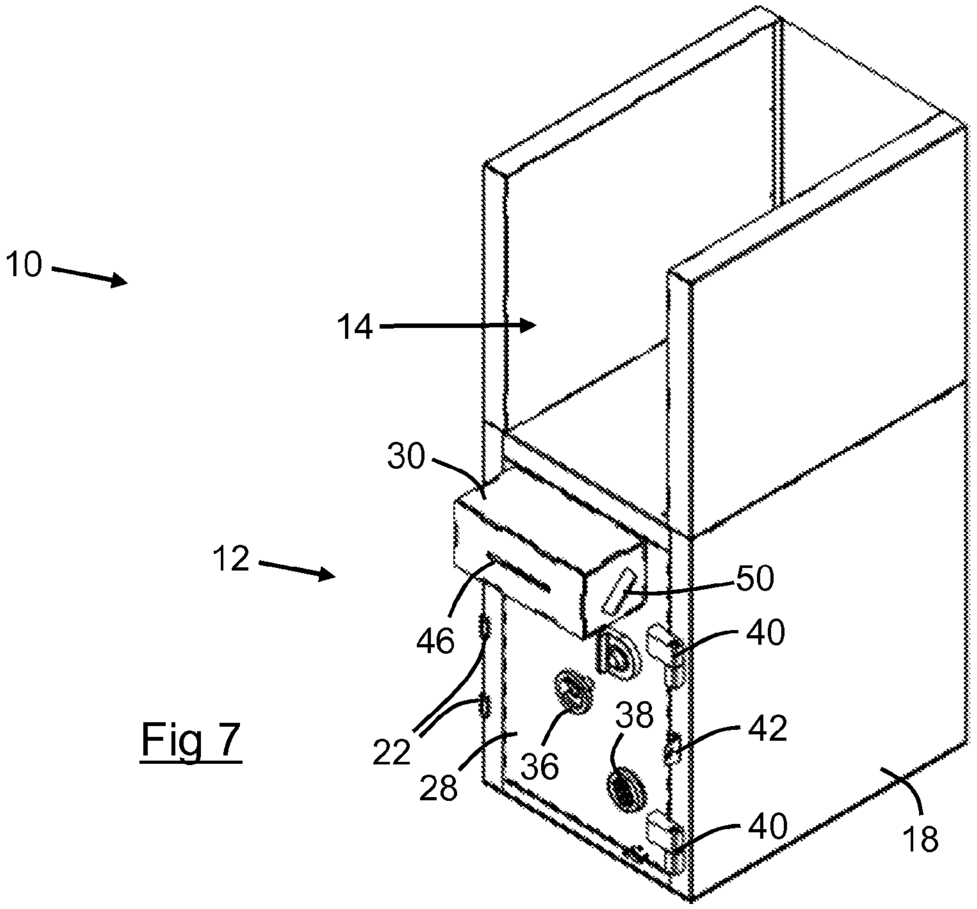
FIG. 7 is a front perspective view of part of the ATM of FIG. 1, with the front cover, an ATM fascia, and the purge compartment all removed (in addition to the decorative cladding being removed), illustrating the secure enclosure and an upper secure area.
Figure 8:
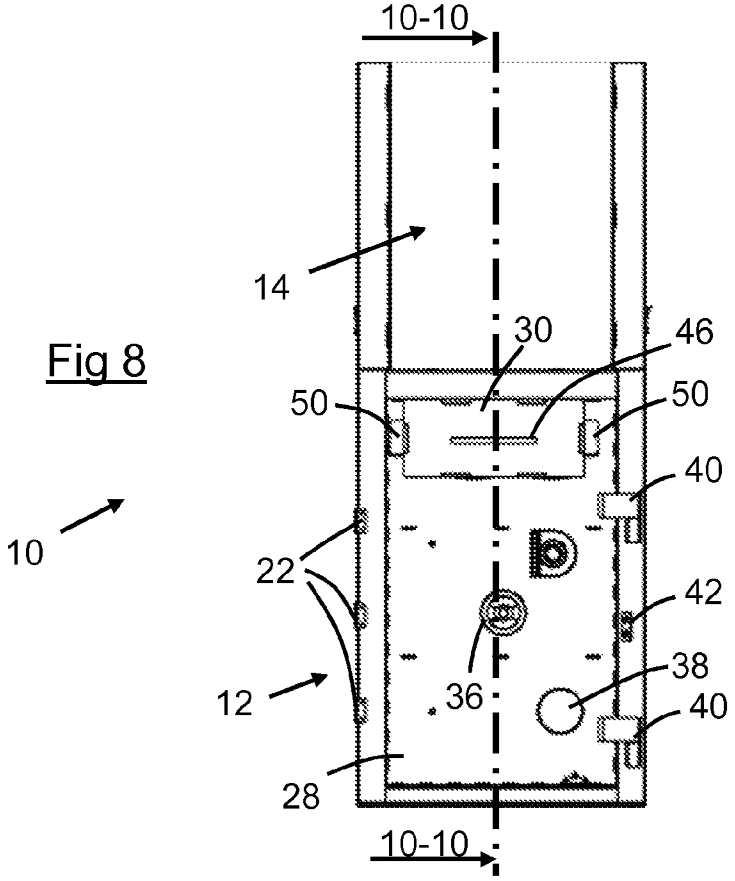
FIG. 8 is a front view of the ATM as shown in FIG. 7.
Figure 9:
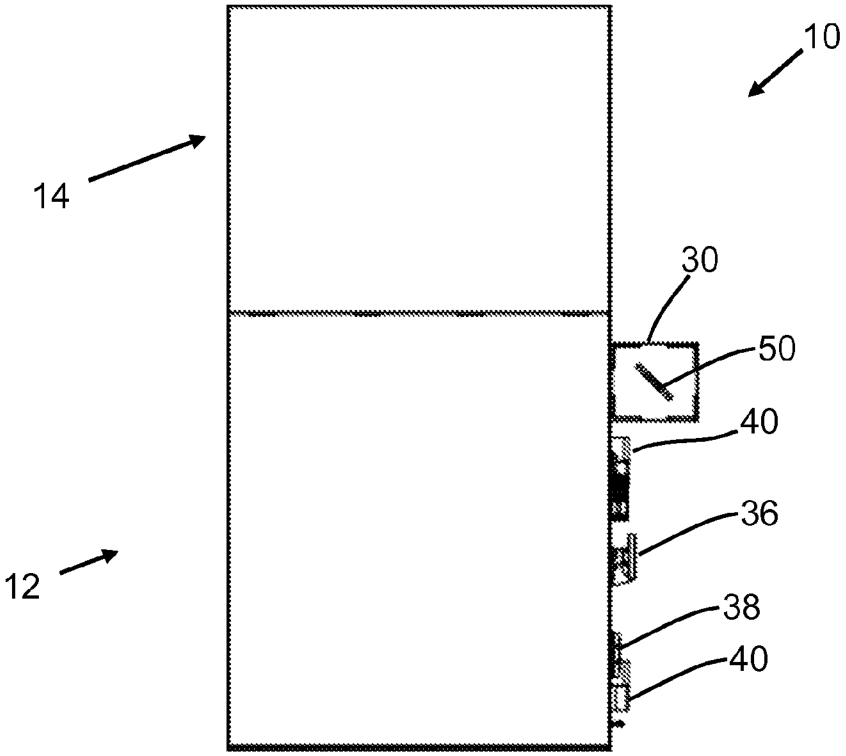
FIG. 9 is a side view of the ATM as shown in FIG. 7.

FIGS. 7 to 9 are CAD renderings that illustrate the ATM 10 without the fascia 16 and without the purge compartment 34.

FIG. 10 shows a sectional perspective view of the ATM 10 (without the fascia 16 or the purge compartment 34). FIG. 10 shows that the safe door 28 includes a curved nose 72 protruding therefrom. The curved nose 72 defines a presentation slot 74 aligned with, but narrower than, the body media slot 56. The curved nose 72 is dimensioned to be accommodated within a conventional shutter on ATM cladding, so that if the secure chamber 30 and purge compartment 34 are not used, then the ATM 10 can be used with conventional cladding as a conventional ATM. The curved nose 72 also reduces transfer to the internal space (shown generally in FIG. 10 by numeral 75) within the main safe body 18 of any explosion within the secure chamber 30. This is because the convex curve of the nose 72 deflects the blast away from the body media slot 56.

FIG. 10 also illustrates purge media guides 76 defined by the secure chamber 30. These purge media guides 76 comprise angled walls that assist transfer of media items from the secure drum 62 to the purge compartment 34.

The purge media guides 76 are designed with structural rigidity so that they also serve another purpose. The rotating shaft 64 and/or the bearing mounts 68 are designed to break if excessive force is applied to the secure drum 62. If the rotating shaft 64 and/or the bearing mounts 68 break, then the secure drum 62 will drop a short distance (only a few millimeters) and land on the purge media guides 76, which prevents the secure drum 62 from dropping any further. This ensures that the secure drum 62 continues to block the chamber media slot 46 so that an attacker cannot easily introduce explosive into the secure chamber 30. In addition, a sensor (not shown) may be provided to detect if the rotating shaft 64 and/or the bearing mounts 68 break. If this occurs, then the sensor may raise an alarm, which might deploy a media protection system within a media dispenser in the secure enclosure 12. This would either destroy or render valueless any media within that media dispenser. Media protection systems are well-known, and include an incendiary system for burning media items, ink staining for staining media items, injection of glue to adhere media items together, and the like.

FIG. 11 is a sectional side view of the ATM 10 showing a media dispenser 78 (in the form of a currency dispenser) located within the main safe body 18, including a bunch of media items 80 (in the form of banknotes) being transferred from the media dispenser 78 to the secure drum 62.

The operation of the secure drum 62 will now be described with reference to FIGS. 12*a* to 12*f*, which illustrate the media transport 60 in six different positions corresponding to various positions between receiving the banknotes 80, dispensing the banknotes 80 to a customer, and transferring the banknotes 80 to the purge compartment 34.

The secure drum 62 defines a drum slot 84 for receiving a bunch of media items, such as banknotes 80. The secure drum 62 is rotated by a stepper motor (not shown) under control of the ATM 10. For clarity, the banknotes 80 are only shown in FIGS. 12*d* to 12*f*.

Figure 12A:
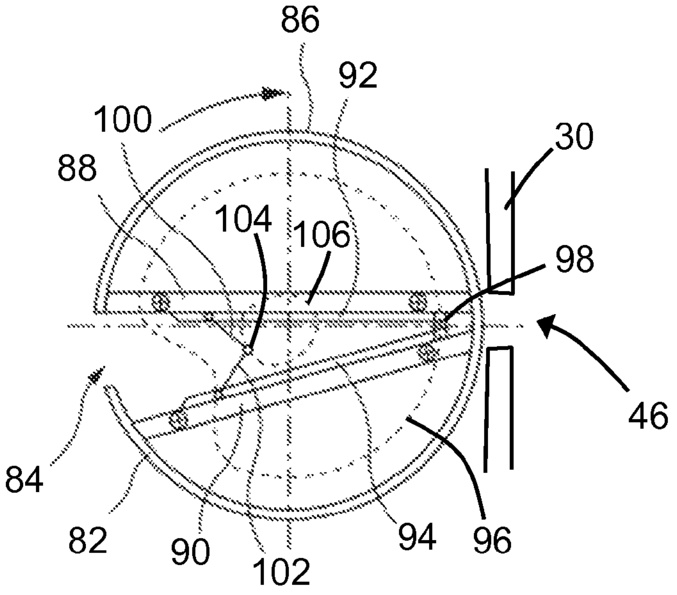
Figure 12B:
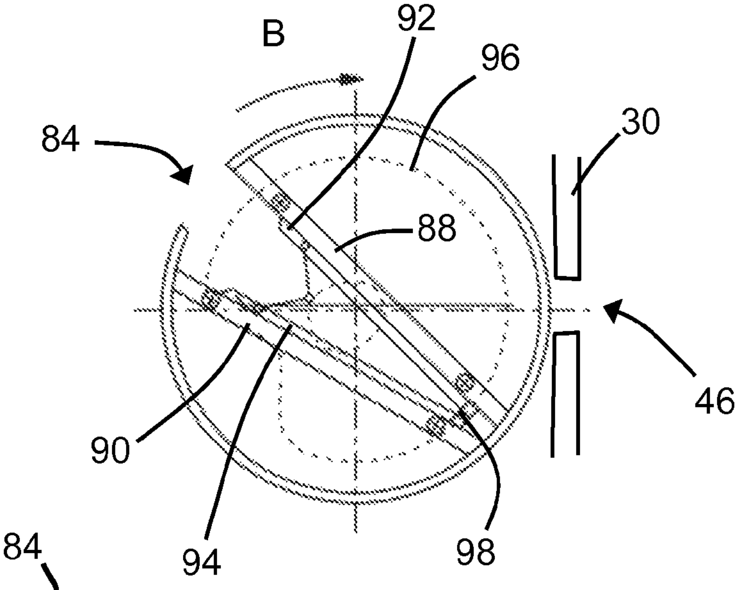
Figure 12C:
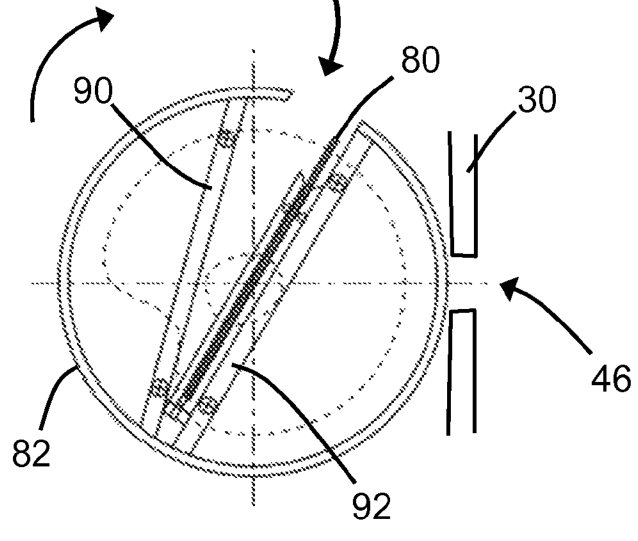

FIG. 12*a* illustrates the position of the secure drum 62 in the "awaiting customer" state. At this point, a customer looking at the customer media slot 22 in the front cover 20 (or at a slot defined by cladding covering the front cover 20, if cladding is used) of the ATM 10 sees only a section of the outer surface of the secure drum 62. The distance between an outer surface 86 of the secure drum 62 and the chamber media slot 46 is small (preferably less than two millimeters) so that it is difficult to insert any solid explosive material (such as plastic explosive) therebetween.

The secure drum 62 includes a first support strut 88 which extends more or less diametrically across the inside of the secure drum 62 and a second support strut 90 which is supported within the secure drum 62 at an angle of about around ten to thirty degrees with respect to the first support strut 88.

The support struts 88, 90 are fixed in place and move with the secure drum 62 as the secure drum 62 rotates. The support struts 88, 90 may be plates or multiple bars extending along the length of the secure drum 62.

A pair of pivotable plates 92, 94 are carried and supported by the respective struts 88, 90. These plates 92, 94 open and close like jaws automatically as the secure drum 62 rotates. These plates 92, 94 are coupled to an outer cam profile 96 (shown as a broken line) and at a pivot point 98, and the pivot point 98 acts as a cam follower as it moves along the outer cam profile 96. This causes the plates 92, 94 to move towards and away from the secure drum perimeter at particular points in the rotation cycle of the secure drum 62 as it rotates.

A first linkage arm 100 is secured to the first plate 92 and a second linkage arm 102 is secured to the second plate 94. These first and second linkage arms 102, 104 are coupled at a pivot 104. The pivot 104 acts as a cam follower as it moves along an inner cam profile 106. When this occurs, the first and second linkage arms 102, 104 open and close the pivotable plates 92, 94 automatically as the secure drum 62 rotates. The pivotable plates 92, 94 function as a media item holder.

As illustrated in FIG. 12*a*, when a customer is duly authorized and requests cash, banknotes 80 are picked, collated, and presented as a bunch by the currency dispenser 78 through the curved nose presentation slot 74.

The banknotes 80 are grasped between the pivotable plates 92, 94 as illustrated in FIG. 12*a*. The notes are introduced in a substantially horizontal direction, and will collect between the plates 92, 94. They do not fall out because of a lip provided by part of the wall of the secure drum 62.

Figure 12D:
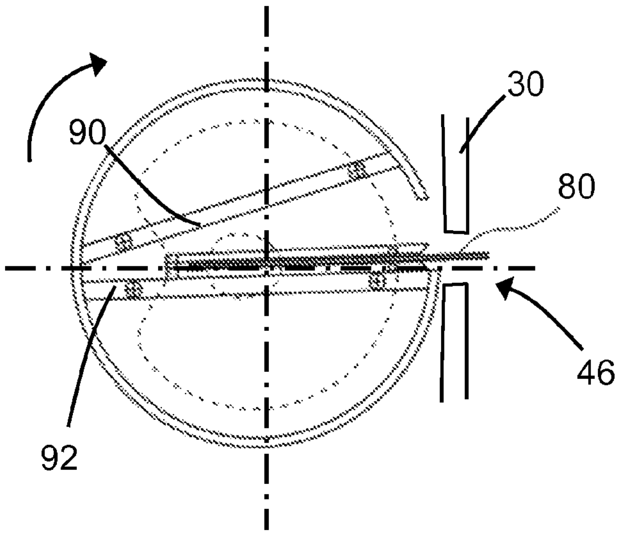

The secure drum 62 is then rotated (see FIGS. 12*b* and 12*c*) in a clockwise direction (shown by arrow B in FIG. 12*b*) until the drum slot 84 is aligned with the chamber media slot 46 (as shown in FIG. 12*d*). During this rotation, gravity acts to urge the banknotes towards the pivot point 98 to form a neat bunch. When the secure drum 62 rotates to the point shown in FIG. 12*c*, the plates 92, 94 have been closed by the action of the first and second linkage arms 102, 104, the pivot 104, and the inner cam profile 106.

When the secure drum 62 rotates to the point shown in FIG. 12*d*, the banknotes 80 are presented to the customer. This is facilitated by the pivot point 98 acting as a cam follower as it moves along the outer cam profile 96 and urging the plates 92, 94 towards the secure drum 62 perimeter, as illustrated in FIG. 12.

If the customer does not remove the banknotes 80 within a predefined time, then the banknotes are sent to the purge compartment 34. This is implemented by continued rotation of the secure drum 62.

Figure 12E:
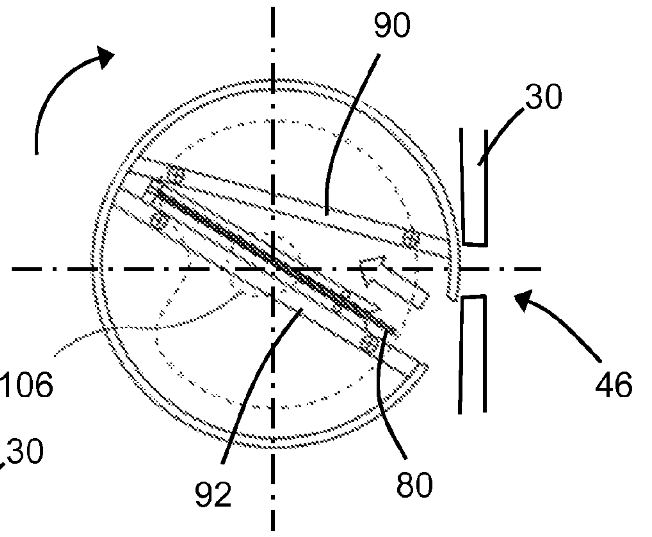

As illustrated in FIG. 12*e*, continued rotation of the secure drum 62 subsequent to either the banknotes 80 being removed by a customer or (as shown in FIG. 12*e*) subsequent to a time-out occurring in which case the banknotes 80 are retracted if not taken, causes the plates 92, 94 to be retracted. This draws the banknotes 80 back within the recess of the secure drum 62.

Figure 12F:
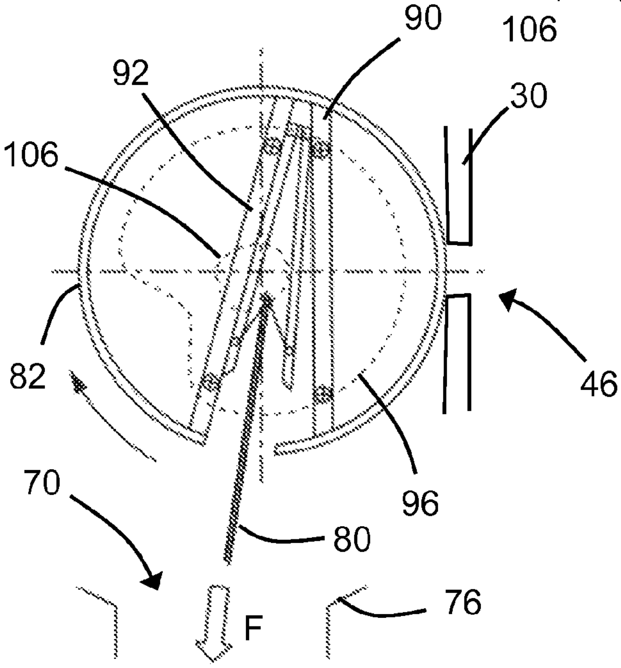

FIG. 12*f* illustrates a subsequent position of the secure drum 62 in which the secure drum 62 has been rotated a further clockwise step relative to the position shown in FIG. 12*e*. In this position, the banknotes 80 which have not been removed by the customer are aligned almost vertically. In this position, the plates 92,94 automatically open and the pinching force is thereby removed. Gravity causes the banknotes 80 to be released and these banknotes 80 fall through the purge media guides 76, then the purge compartment slot 70 and into the purge compartment 34, as shown by arrow F in FIG. 12*f*.

The secure drum 62 can then be rotated further in a clockwise direction to return to a home position as illustrated in FIG. 12*a* ready for the next dispensing operation.

Referring again to FIG. 11, the currency dispenser 78 also includes a media protection system 110 in the form of an incendiary system. The ATM 10 also includes various explosion detection sensors in the form of electrical sensors and seismic sensors. These explosion detection sensors are coupled to a central sensor controller 112 located within the main safe body 18.

The secure chamber 30 includes a seismic sensor 114 to detect any movement of the secure chamber 30, for example, by an attacker trying to insert explosives. The main safe body 18 also includes a seismic sensor 116 to detect any movement of the main safe body 18, for example, as a result of an explosion in the secure chamber 30.

The secure chamber 30 also includes two electrical sensors (not shown). One electrical sensor (not shown for clarity) includes wires that surround the chamber media slot 46 to detect if someone tries to force an object (such as an iron bar or solid explosives) through the slot 46, thereby rupturing the sensor wires and tripping that electrical sensor. Another electrical sensor (also not shown for clarity) includes wires that surround the body media slot 56 to detect if someone tries to force an object (such as an iron bar or solid explosives) through the slot 56, thereby rupturing the sensor wires and tripping that electrical sensor.

The central sensor controller 112 is provided to receive signals from each of the electrical and seismic 114,116 sensors to ascertain if the incendiary system 110 should be deployed to render the banknotes valueless.

When the sensor controller 112 detects that one of the sensors has been triggered, then the sensor controller 112 deploys the incendiary system 110. In this embodiment, this causes the currency in each currency cassette (not shown) within the currency dispenser 78 to be ignited, thereby rendering valueless the banknotes stored therein.

When a customer engineer or cash replenisher accesses the currency dispenser 78, they first disable the media protection system 110 via an operator panel within the ATM 10 to ensure that the media protection system 110 is not accidentally triggered.

If, during operation, the ATM 10 is attacked by a person inserting solid or gaseous explosives then the following scenario is probable.

The attacker may try and force the secure drum 62 away from the chamber media slot 46 using, for example, a steel bar or screwdriver. If this occurs, the electrical sensor at the chamber media slot 46 may be ruptured by the steel bar, which would be detected by the sensor controller 112.

If the electrical sensor at the chamber media slot 46 is not ruptured, then the rotating shaft 64 and/or the bearing mounts 68 will break causing the secure drum 62 to drop onto the purge media guides 76. If this movement (dropping) of the secure drum 62 is detected by the seismic sensor 114 in the secure chamber 30, then the seismic sensor 114 would alert the sensor controller 112.

If the secure drum 62 dropping is not detected by the seismic sensor 114 in the secure chamber 30, then the attacker may try and insert explosives. It will be difficult to insert solid explosives because there is so little room between the secure drum 62 and the chamber media slot 46.

If gaseous explosives are inserted, then the explosive gas (which is heavier than air) will tend to go downwards into the purge compartment 34 rather than through the narrow curved nose slot 74.

If solid explosives are inserted, then the solid explosives will remain in the secure chamber 30, rather than being transferred to the main safe body 18.

In either event (solid or gaseous explosives), detonation of these explosives will probably destroy the secure chamber 30 and the purge compartment 34; however, the design of the secure chamber 30 should deflect the explosion sufficiently so that the main safe body 18 is not destroyed. The seismic sensor 116 within the main safe body 18 will detect the explosion and alert the sensor controller 112, which will trigger the media protection system 110 so that the banknotes in the currency dispenser 78 will be rendered valueless.

It will now be appreciated that the secure chamber 30 effectively buys time for the currency dispenser 78 to deploy the media protection system 110. This deters attackers from trying any future attacks because they do not retrieve any usable banknotes.

It should be appreciated that this embodiment has the advantage that a conventional, unmodified, currency cassette can be safeguarded, without having to separate different parts of the dispenser, for example, housing the presenter in one safe and the picking components in a separate safe.

Various modifications may be made to the above described embodiment within the scope of the invention, for example, in other embodiments, the media transport may include additional motors to drive the media items therein, to clamp the media items, and/or to eject the media items. This avoids having to rely on cams, cam followers, and gravity.

In other embodiments, the media transport may comprise a linear transport that can divert media items from the customer presentation position to the purge compartment slot.

The composition of the secure enclosure walls have not been described in detail, because the composition and size of the walls may be selected depending on the desired security rating.

In other embodiments, a deposit or recycler module may be provided instead of, or in addition to, the dispenser module.

In other embodiments, a secure enclosure other than an ATM safe may be provided, for example, a vault having no apertures, or only one aperture for a key.

In other embodiments, the brackets 66 may be coupled to the secure chamber 30 instead of being coupled to the safe door 28. This would enable the media transport 60 to be removed from the safe door 28 as a single item.

In other embodiments, different or additional explosion detection sensors may be used. For example, in addition to the electrical sensors and seismic sensors, air pressure sensors may be used.

The invention claimed is:

1. A secure enclosure comprising:

a body defining (i) an access opening and (ii) a body media slot; and a secure chamber mounted outside the body and surrounding the body media slot, the secure chamber defining a chamber media slot, and multiple chamber handles mounted on sides of the secure chamber adapted to enable the secure chamber to be lifted away from the body upon release, and a safe door having six chamber engagement slots, each chamber engagement slot adapted to receive mounting lugs on an inner side of the safe door to affix the safe door to the secure chamber, wherein the secure chamber is adapted to be removed from the body when the safe door is opened and the mounting lugs are removed from the six chamber engagement slots.

2. A secure enclosure according to claim 1, wherein the secure enclosure comprises a media transport operable to convey media between the body media slot and the chamber media slot.

3. A secure enclosure according to claim 2, wherein the media transport comprises a rotatable cylindrical transport.

4. A secure enclosure according to claim 3, wherein the rotatable cylindrical transport comprises a secure drum defining a slot for receiving media items.

5. A secure enclosure according to claim 4, wherein when the secure drum is rotated to a first position, the slot in the secure drum aligns with the body media slot to allow media to enter the secure drum.

6. A secure enclosure according to claim 5, wherein when the secure drum is rotated to a second position, the secure drum slot aligns with the chamber media slot to allow media to be removed from the secure chamber by a customer.

7. A secure enclosure according to claim 6, wherein when the secure drum is rotated to a third position, the secure drum slot aligns with a purge slot defined by a lower surface of the secure chamber, so that media items may exit the secure drum and pass through the purge slot into a purge compartment.

8. A secure enclosure according to claim 4, wherein the secure drum is mounted on a drum coupling, wherein the drum coupling comprises brackets mounted to the secure enclosure, a shaft on which a secure drum is mounted, and bearing mounts that couple the shaft to the brackets; and wherein the drum coupling is designed to break in response to external force being applied to the secure drum prior to the secure drum breaking.

9. A secure enclosure according to claim 4, wherein the secure chamber is vertically dimensioned such that when the secure drum falls, the secure drum blocks the chamber media slot, thereby preventing unauthorized access to the secure chamber via the chamber media slot.

10. A secure enclosure according to claim 4, wherein the secure chamber defines upstanding purge media guides on an inner, lower surface thereof, the upstanding purge media guides being dimensioned to support the secure drum if the drum coupling breaks.

11. A secure enclosure according to claim 4, wherein the secure chamber is horizontally dimensioned such that the secure drum occupies most of the horizontal space within the secure chamber, thereby preventing an attacker from pushing the secure drum away from the chamber media slot.

12. A secure chamber for removably coupling to a secure enclosure, the secure chamber comprising: a body defining (i) an opening for surrounding a media slot in the secure enclosure, (ii) a chamber media slot through which media may be conveyed between the secure chamber and a customer, and a chamber handle mounted on each of the sides of the secure chamber adapted to enable the secure chamber to be lifted away from the body upon release (iii) a transport operable to transfer media between the media slot in the secure enclosure and the chamber media slot, (iv) and a safe door affixed to the secure chamber through one or more chamber engagement slots situated on an inside of each side of the safe door, each slot adapted to receive a mounting lug to affix the safe door to the secure chamber, and wherein secure chamber is adapted to be removed from the body when the safe door is opened and the mounting lugs are removed from six chamber engagement slots.

13. A secure chamber according to claim 12, wherein the secure chamber body defines a purge slot located on an underside of the chamber body so that media items that are not removed by a customer may be dropped through the purge slot.

* * * * *